3,164,318
PRESSURE EXCHANGERS
John Anthony Barnes, Wokingham, and John Percy Vickery, Farnborough, England, assignors to Power Jets (Research & Development) Limited, London, England, a British company
Filed Sept. 13, 1961, Ser. No. 137,862
Claims priority, application Great Britain Sept. 21, 1960
10 Claims. (Cl. 230—69)

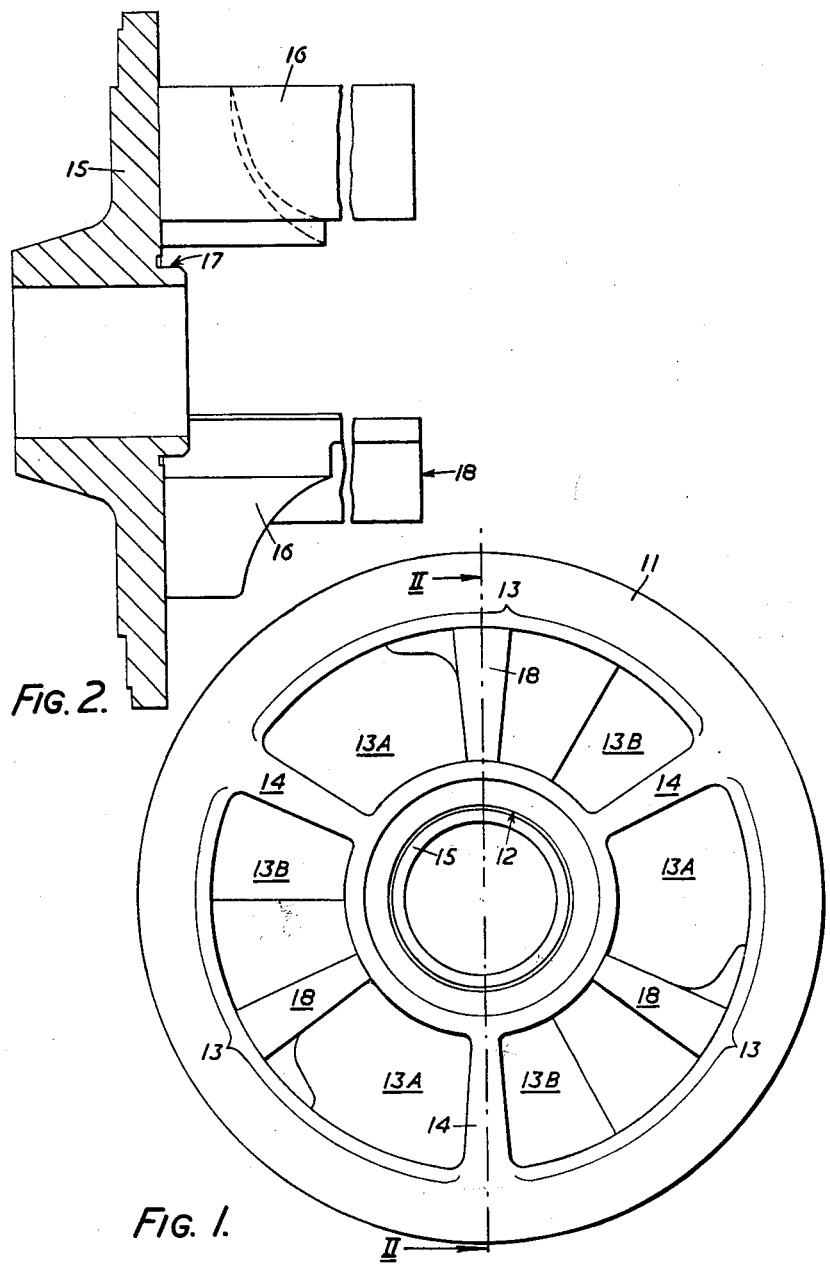

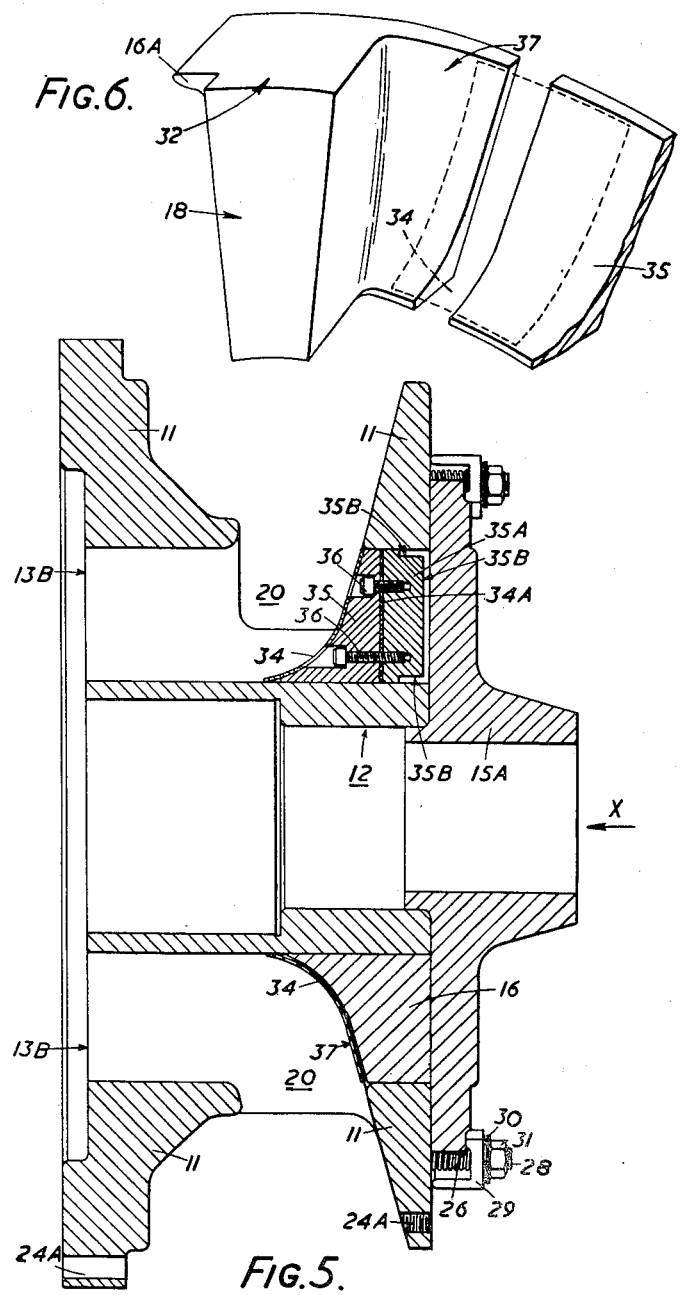

This invention relates to pressure exchangers and particularly to end-plate structure of pressure exchangers.

The term "pressure exchanger" is used herein to mean apparatus comprising cells in which one fluid quantity expands, so compressing another fluid quantity with which it is in contact, ducting to lead fluid substantially steadily to and from the cells at different pressures and means to effect relative motion between the cells and the ducting.

In a pressure exchanger two streams of fluid, one at a high pressure and one at a lower pressure may be introduced into the cells and these streams may be combined into a single stream of fluid at an intermediate pressure issuing from an outlet of the pressure exchanger. In this case the pressure exchanger is said to be a pressure equalizer.

Alternatively, in a pressure exchanger a single stream of fluid at an intermediate pressure may be introduced into the cells and this stream of fluid may be divided into two streams, one at a pressure higher and one at a pressure lower than the intermediate pressure. In this case the pressure exchanger is said to be a pressure divider.

The cells of a pressure exchanger are customarily open-ended and are usually mounted in a circular array as a cell ring. The cell ring is usually rotated by an electric motor. End-plates effective to close the open ends of the cells, are usually arranged in close proximity to the ends of the cells and are provided with ducts affording communication with the cells. The ducts are terminated by ports in the faces of the end-plates adjacent the cell ring and the ports have leading edges and trailing edges which respectively open and close the ends of the cells as the cell ring is rotated. In certain circumstances it is desirable that the relative circumferential positions of these edges and the circumferential dimensions (sometimes referred to as the "width") of the ports should be made variable.

Accordingly, the invention provides a pressure exchanger incorporating a ring of open-ended cells, an end-plate effective to close one end of the cells but having a port communicating with the cells, a duct formed in the end-plate one end of which duct is terminated by the port, a member mounted for arcuate adjustment on the end-plate and means projecting from the member into the duct thereby dividing the duct and port and providing two discrete flow paths communicating with the cell ring.

The pressure exchanger may be arranged for two or more cycles to take place during each revolution of the cell ring and may have a plurality of ducts and ports in the end-plate each being divided by the said means. The ducts may be arranged so that, at their ends remote from the ports adjacent the cell ring, one duct is substantially parallel to the axis of the cell ring whilst the adjacent duct is substantially normal to the axis of the cell ring. When such a pressure exchanger is arranged as an equalizer or as a divider the ducts having portions which are substantially normal to the axis of the cell ring may be the high-pressure fluid ducts.

Arcuate adjustment of the member relative to the end-plate may be controlled in accordance with an operating requirement of the pressure exchanger or in accordance with an operating requirement of a plant of which the pressure exchanger may be a part. Such an operating requirement may be the temperature level, the pressure level, or the flow rate at a given stage of the plant, or it may be the speed of rotation of either the cell ring of the pressure exchanger or another rotary component of the plant.

Various embodiments of the invention will now be described, by way of example, with reference to the accompanying diagrammatic drawings.

FIGURE 1 is a view of the radially inner portion of a pressure equalizer end-plate with dividing means and a supporting member in position;

FIGURE 2 is a section on the line II—II of FIGURE 1 but showing only the dividing means and the supporting member;

FIGURE 5 is a longitudinal section taken on the line V—V of FIGURE 3;

FIGURE 6 is a perspective view of the dividing means and a co-operating fairing block;

Figure 3:
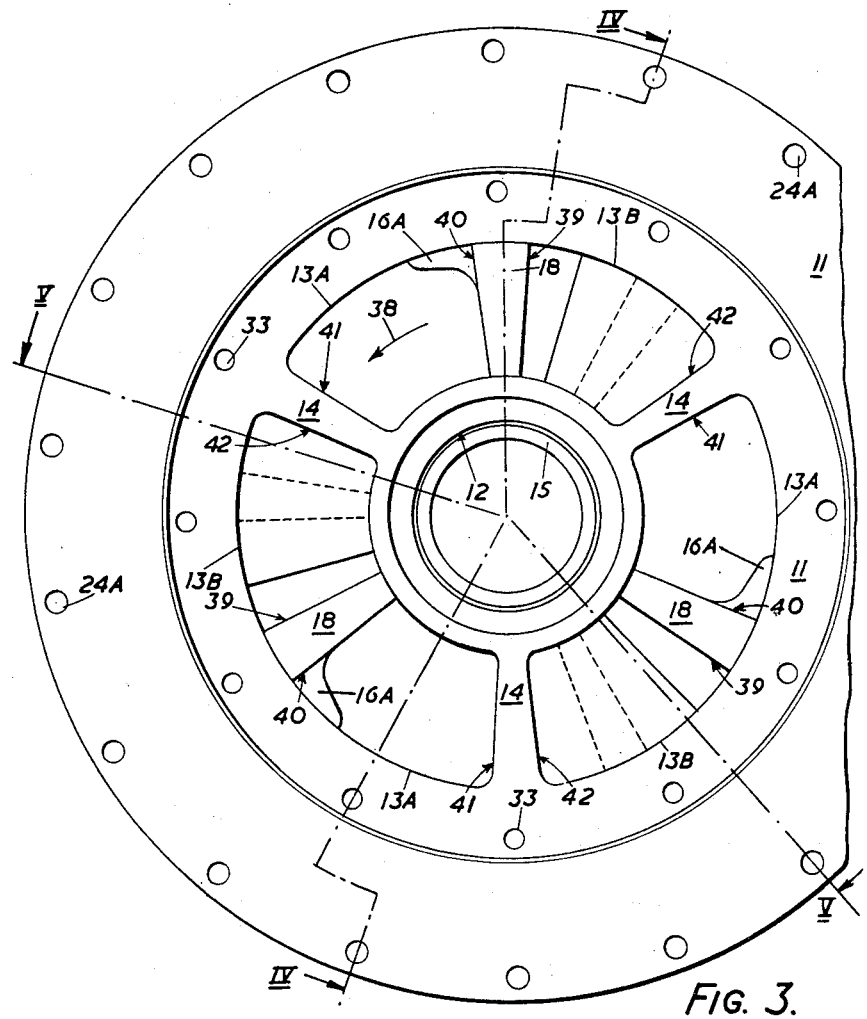
FIGURE 3 is a more detailed view of the pressure equalizer end-plate looking along the rotor axis.

In the embodiment to be described, the means to divide the ducts in the end-plate take the form of land-blocks. The end-plate and land-block supporting member (in this specific description hereafter referred to as the fixed end-plate and the adjustable end-plate respectively) shown in the drawings is that of a triple-cycle pressure equalizer in which three separate but identical equalizing processes take place in parallel. The arrangement of the fixed and adjustable end-plates will be more readily appreciated by first referring only to FIGURES 1 and 2. In FIGURE 1 considerable detail shown in the later figures has been omitted, thus allowing a clearer showing of the six ports which terminate the six ducts formed by the fixed and adjustable end-plates.

A fixed end-plate 11 with a central bore 12 is provided with three ports 13 spaced apart by three fixed lands 14. An adjustable end-plate 15 having three equally spaced and axially extending land-blocks 16, (only two of which appear in FIGURE 2) is mounted for arcuate adjustment relative to the fixed end-plate 11, by means of a spigot bearing surface 17, in the bore 12 of the fixed end-plate 11. The land faces 18 on the land-blocks 16, lie in the same plane as the faces of the lands 14 of the fixed end-plate 11. Thus it will be seen that each of the three land-blocks 16 divides a port 13 into two ports 13A and 13B and also provides a wall dividing the duct terminated by the port 13. It will also be seen that arcuate adjustment of the adjustable end-plate 15 relative to the fixed end-plate 11 will vary the circumferential dimensions of the ports 13A and 13B. Such arcuate adjustment will at the same time vary the timing of cell opening and closing by the edges of the lands 18 relative to the timing of cell opening and closing by the edges of the lands 14.

Figure 4:
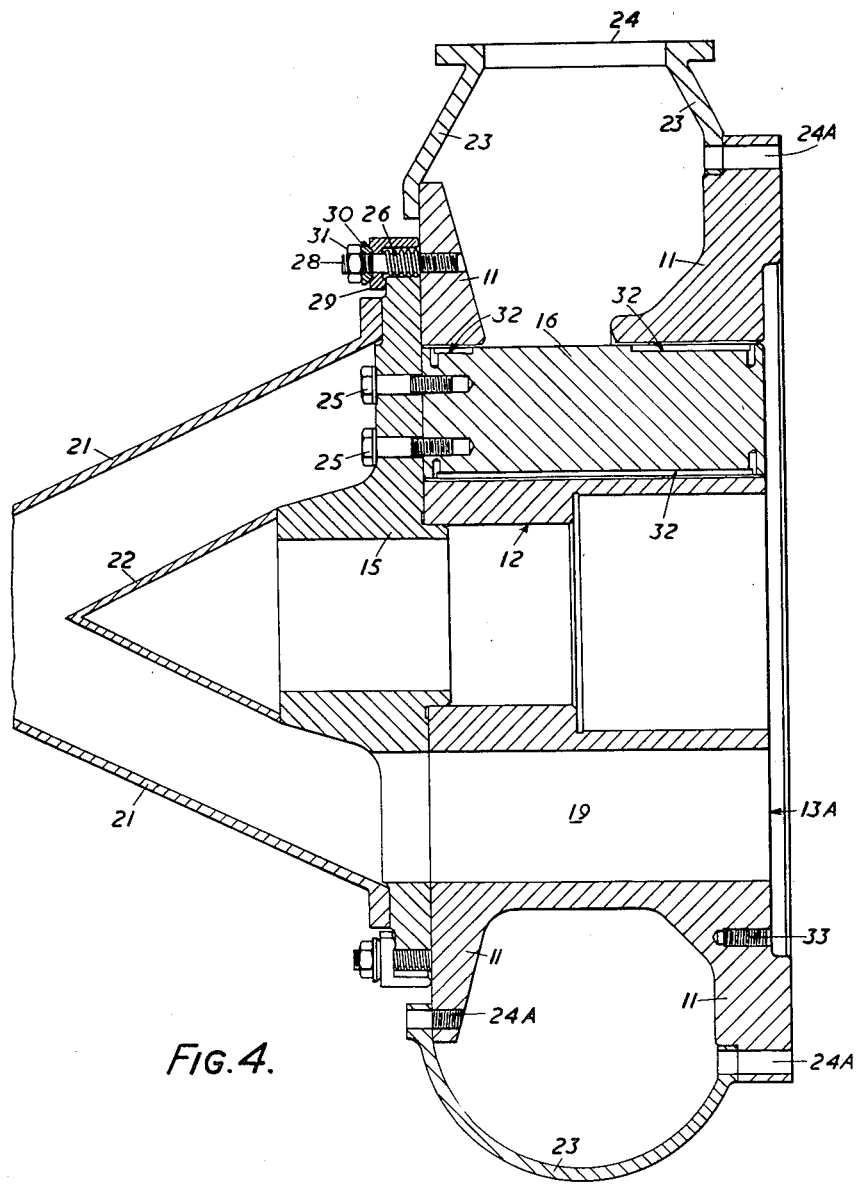
FIGURE 4 is a longitudinal section taken on the line IV—IV of FIGURE 3.

Referring now to FIGURES 3 to 5; the arrangement of the fixed end-plate 11 and the adjustable end-plate 15 provides three axial ducts 19 (only one of which is shown, FIGURE 4) each terminated by one of the ports 13A, and three part radial, part axial ducts 20 (two of which are shown, FIGURE 5) each terminated by one of the ports 13B. The axial ducts 19 communicate at their ends remote from the ports 13A with ducting formed by a collector casing 21 and a cone 22 (both shown only in FIGURE 4) which are secured to the adustable end-plate 15. The part radial, part axial ducts 20 communicate, at their ends remote from the ports 13B, with a scroll formed by a cover 23 and the fixed end-plate 11. The cover 23 is provided with an inlet 24 and is secured to the fixed end-plate 11 by bolts (not shown) engaging in bores 24A.

Each of the land-blocks 16 is secured to the adjustable end-plate 15 by bolts 25 engaging tapped holes in the blocks. During operation the adjustable end-plate 15 is secured against rotation relative to the fixed end-plate 11 by a circumferential row of studs 28, clamps 29, washers 30 and nuts 31. Helical release springs 26 surrounding each stud 28 are provided to urge the clamps 29 away from the adjustable end-plate 15 when the nuts 31 are slackened.

To prevent leakage over the land-blocks 16 between the passages 19 and 20, sealing means (not shown) are provided between circumferential faces 32 on the land-blocks 16 and the adjacent circumferential faces of the fixed end-plate 11.

The fixed end-plate 11 is provided with a circumferential row of bolt holes 33 for securing thereto a telescopic casing, such telescopic casings being fully described in British patent specification No. 722,609.

Referring now to FIGURES 3, 5 and 6, fairing plates 34 (two of which are shown in solid lines in FIGURE 5 and one of which is indicated by broken lines in FIGURE 6) are secured to fairing blocks 35 by brazing and the fairing blocks 35 are secured to sealing blocks 35A by bolts 36. The sealing blocks 35A are secured to the fixed dividing walls of the fixed end-plate 11. The fairing plates 34 overlap fairing surfaces 37 on the land-blocks 16, thus providing a substantially continuous wall for the passages 20 whatever the position of the adjustable end-plate 15. Clearance between the fairing surfaces 37 of the land-blocks 16, and the fairing plates 34 can be adjusted by shims 34A between the sealing blocks 35A and the fairing blocks 35.

To prevent leakage between the passages 19 and 20 around the sealing blocks 35A (i.e. between the sealing blocks 35A and the adjustable end-plate 15) sealing means (not shown) are provided between faces 35B of the sealing blocks 35A and adjacent faces of the fixed and adjustable end-plates. Extensions 16A (FIGURES 3 and 6) are provided on the land-blocks 16 and these serve as sealing surfaces when the adjustable end-plate 15 has been moved as far as possible in the clockwise direction as viewed in FIGURE 3. Similar extensions are provided on the sealing blocks 35A.

The cell ring (not shown) is arranged for rotation in the direction of an arrow 38 (FIGURE 3) and the ports 13B provide high-pressure fluid inlets whilst the ports 13A provide lower-pressure fluid inlets. The land faces 18 on the land-blocks 16 effectively provide cell closure members having high-pressure fluid inlet port trailing edges 39 and lower-pressure fluid inlet port leading edges 40. Similarly the faces of the fixed lands 14 on the fixed end-plate 11 provide cell closure members having lower-pressure fluid inlet port trailing edges 41 and high-pressure fluid inlet port leading edges 42.

Counter-clockwise arcuate adjustment of the adjustable end-plate 15 (in FIGURE 3) relative to the fixed end-plate 11, retards both the opening of the lower pressure fluid inlet port 13A to the cells and the closing of the high-pressure fluid inlet port 13B to the cells, relative to the closing and opening of these ports respectively. Conversely, clockwise adjustment of the adjustable end-plate 15 advances the opening and closing of these ports. Furthermore, any such arcuate adjustment of the adjustable end-plate will result in a variation of the circumferential dimensions of the ports 13A and 13B, increasing the one at the expense of the other, and vice versa.

The circumferential disposition of the adjustable end-plate 15 and the fixed end-plate 11 may be varied in accordance with an operating requirement of the equalizer or in accordance with an operating requirement of a plant of which the equalizer may be a part. If such variation is required during operation, the clamps 29 would be replaced by means to maintain the axial disposition of the two end-plates whilst allowing arcuate adjustment of the adjustable end-plate 15 relative to the fixed end-plate 11.

Figure 7:
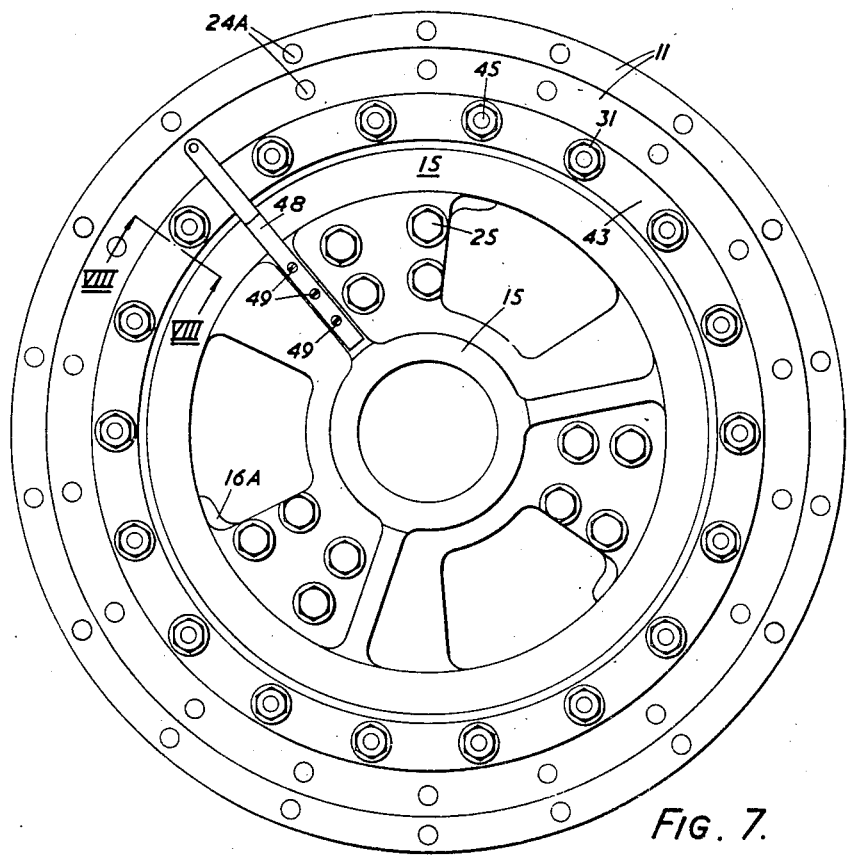
FIGURE 7 is a view in the direction indicated by the arrow X in FIGURE 5 and shows an alternative method of securing the supporting member.
Figure 8:
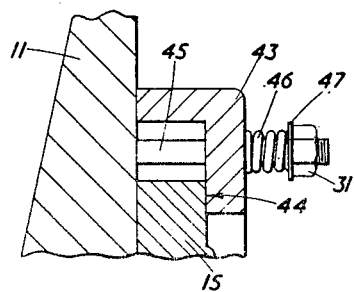
FIGURE 8 is an enlarged view of a section taken on the line VIII—VIII in FIGURE 7.

Such an arrangement is shown in FIGURES 7 and 8 in which a ring 43 replaces the circumferential row of clamps 29 shown in and described with reference to FIGURES 4 and 5. The ring 43 is arranged to abut an end face 44 (FIGURE 8) of the adjustable end-plate 15, and is restrained against axial movement thereto by means of studs 45, helical springs 46, washers 47 and nuts 31. The helical springs 46 are compressed by the nuts 31 only sufficiently to prevent axial movement of the adjustable end-plate 15 whilst allowing arcuate movement thereof during operation. A lever 48 (FIGURE 7) is secured to the adjustable end-plate 15 by means of set-screws 49.

Figure 9:
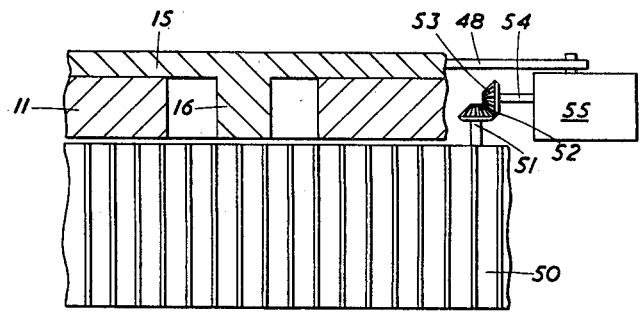
FIGURE 9 shows a portion of the pressure equalizer in a developed view and an arrangement for adjusting the dividing means.

FIGURE 9 shows an arrangement whereby arcuate movement of the adjustable end-plate 15 is controlled in accordance with the speed of the pressure exchanger cell ring. A cell ring 50 is coupled to a shaft 51 to which is secured a bevel gear 52. A bevel gear 53 meshes with the bevel gear 52 and is itself secured to a shaft 54 which is coupled to a governor 55. The governor 55 is arranged to control the position of the lever 48 and hence the arcuate position of the adjustable end-plate 15 relative to the fixed end-plate 11.

Figure 10:
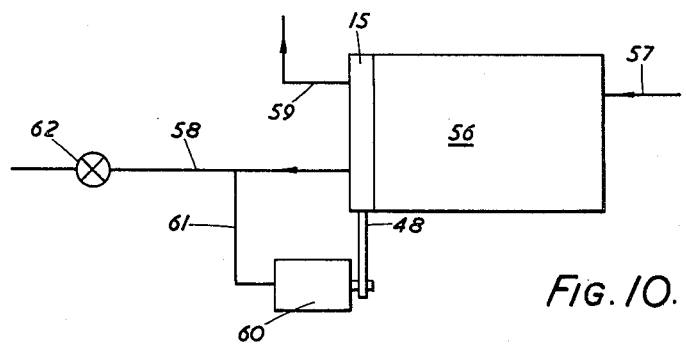
FIGURE 10 shows the circuit of a plant incorporating pressure equalizer.

In FIGURE 10 a pressure exchanger according to the invention, shown at 56, is arranged to operate as a pressure divider and has an intermediate pressure fluid inlet duct 57, a higher-pressure fluid outlet duct 58 and a lower-pressure fluid outlet duct 59. The duct 58 is connected by a pressure line 61 to a pressure-sensitive device 60. The lever 48 of the end-plate 15 is controlled by the pressure-sensitive device 60. A valve 62 controls the flow of fluid out of the duct 58.

In operation fluid at a constant intermediate pressure is supplied to the duct 57. The pressure divider 56 divides this flow of fluid into two streams, the higher pressure stream passing out of the duct 58 and the lower pressure stream passing out of the duct 59. When the demand is for fluid at a relatively low outlet pressure from the duct 58 the valve 62 is set to its fully open position, and the pressure-sensitive device 60 responds to this fluid at relatively low pressure, which it senses via the pressure line 61, by adjusting the position of the end-plate 15 to provide a relatively wide lower-pressure outlet port. Conversely, when the demand is for fluid at a higher pressure in the duct 58 the valve 62 is adjusted to a more nearly closed position ad the pressure-sensitive device 60 responds to the rise in fluid pressure in the duct 58 by adjusting the position of the end-plate 15 to provide a relatively narrow lower-pressure outlet port. Thus, whatever the fluid output pressure required in the duct 58 the pressure-sensitive device 60 adjusts the end-plate 15 to provide optimum port widths for providing that pressure.

Figure 11:
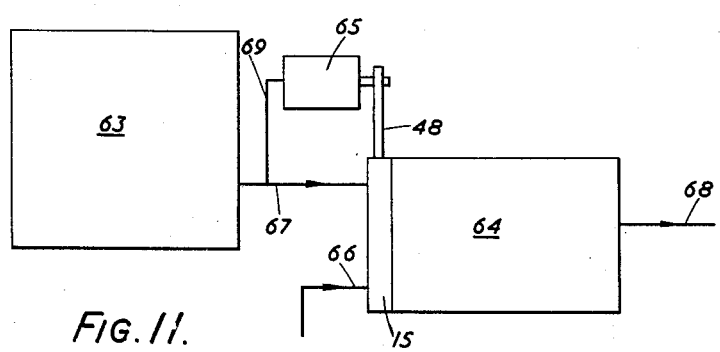
FIGURE 11 shows the circuit of a plant incorporating a pressure divider.

The application of a pressure exchanger according to the invention to provide a vacuum pump for evacuating a container in which a process is to be carried out, is shown in FIGURE 11. The plant, shown in diagrammatic form comprises a container 63 to be evacuated, a pressure exchanger 64 and a pressure-sensitive device 65. The pressure exchanger 64, which is arranged to operate as a pressure equalizer, has a high-pressure fluid inlet duct 66, a lower-pressure fluid inlet duct 67 and an intermediate pressure fluid outlet duct 68. The duct 67 is connected by a pressure line 69 to the pressure-sensitive device 65, and the device 65 controls the position of the end-plate 15 via the lever 48.

In operation, a high-pressure fluid is supplied to the duct 66. When the evacuating process is first started the container 63 is at atmospheric pressure and the end-plate 15 is set by the pressure-sensitive device 65 to provide wide high-pressure ports and narrow lower-pressure ports. As the process continues and the pressure in the container 63, and so in the duct 67, falls, the pressure-sensitive device 65 senses the fall in pressure via the pressure line 69 and adjusts the end-plate 15 so as to decrease the width of the high-pressure ports and increase the width of the lower-pressure ports. If the evacuating process is continued until a very low pressure obtains in the container 63 the position of the end-plate 15 is adjusted by the pressure-sensitive device 65 to provide narrow high-pressure ports and wide lower-pressure ports. Thus, by adjustment of the end-plate 15 the pressure equalizer is provided with optimum port widths in relation to the pressure ratio at which the pressure equalizer is operating.

What we claim is:

1. A pressure exchanger incorporating hub means, a ring of open-ended cells mounted on the hub means, end-plate structure effective to close each end of the cells but having ports therein to control admission of fluid to and removal of fluid from the cells, ducts in communication with the ports, means to cause relative motion between the cells and the end-plate structure, a member positioned in one of the ports to divide that port and adjustably mounted to vary the proportions of the division, and means projecting from the member into the corresponding duct thereby dividing the duct and providing two discrete variable flow paths communicating with the cells of the rotor.

2. A pressure exchanger incorporating hub means, a ring of open-ended cells mounted on the hub means, end-plate structure effective to close each end of the cells but having an inlet port to control admission of fluid to the cells, and an outlet port to control removal of fluid from the cells, ducts in communication with the ports, means to cause relative motion between the cells and the end-plate structure, a member positioned in the inlet port to divide that port and adjustably mounted to vary the proportions of the division, and means projecting from the member into the corresponding duct thereby dividing the duct and providing two discrete variable flow paths communicating with the cells of the rotor, one flow division serving to carry fluid at a high-pressure and the other at a lower-pressure, the said outlet port serving to remove fluid from the cells at a pressure intermediate the high and lower-pressures.

3. A pressure exchanger incorporating hub means, a ring of open-ended cells mounted on the hub means, end-plate structure effective to close each end of the cells but having an inlet port to control admission of fluid to the cells, and an outlet port to control removal of fluid from the cells, ducts in communication with the ports, means to cause relative motion between the cells and the end-plate structure, a member positioned in the inlet port to divide that port and adjustably mounted to vary the proportions of the division, and means projecting from the member into the corresponding duct thereby dividing the duct to form a flow division extending parallel to the rotor axis and a flow division extending normal to the rotor axis, one flow division serving to carry fluid at a high-pressure and the other at a lower-pressure, the said outlet port serving to remove fluid from the cells at a pressure intermediate the high and lower-pressures.

4. A pressure exchanger as claimed in claim 3, in which the flow division extending parallel to the rotor axis serves to carry the lower-pressure fluid.

5. A pressure exchanger as claimed in claim 1, in which the member to divide one of the ports is of generally circular form and includes a centrally disposed spigot engageable in a corresponding bore in the end-plate structure.

6. A pressure exchanger as claimed in claim 5, in which the means projecting from the dividing member has an end-face remote from the said member which lies immediately adjacent an end-face of the rotor.

7. A pressure exchanger as claimed in claim 2, including three of said high-pressure inlet ports, three of said lower-pressure inlet ports and three of said intermediate pressure outlet ports, and duct means to interconnect each similar port.

8. A pressure exchanger as claimed in claim 1, including ring means abutting an end-face of the dividing means and permitting relative arcuate movement with respect to the end-plate structure, spring-loaded stud means to secure the ring to the end-plate structure, and means to adjust the relative position of the said member and the end-plate structure during operation of the pressure exchanger.

9. A pressure exchanger as claimed in claim 8, including a speed-sensitive device, and a linkage coupling the said device and the means to adjust the relative position of the said member and the end-plate structure.

10. A pressure exchanger incorporating hub means, a ring of open-ended cells mounted on the hub means, end-plate structure effective to close each end of the cells but having an inlet port to control admission of fluid to the cells and an outlet port to control removal of fluid from the cells, ducts in communication with the ports, means to effect relative motion between the cells and the end-plate structure, a member positioned in said inlet port to divide that port and adjustably mounted to vary the proportions of the division, and means projecting from the member into the inlet duct thereby dividing the duct and providing two discrete variable flow paths leading to the cells of the rotor, duct means to connect the lower-pressure flow path to a closed vessel to be evacuated, a pressure-sensitive device to monitor the pressure in the vessel and control means to vary the position of the member dividing the inlet port whereby as the pressure falls in the vessel the pressure exchanger can continue to operate at substantially maximum efficiency.

References Cited in the file of this patent
UNITED STATES PATENTS

| | | |
|---|---|---|
| 2,526,618 | Darrieus | Oct. 24, 1950 |
| 2,836,346 | Jendrassik | May 27, 1958 |
| 2,946,184 | Jendrassik | July 26, 1960 |
| 2,968,435 | Jendrassik | Jan. 17, 1961 |
| 3,011,487 | Berchtold | Dec. 5, 1961 |